(12) United States Patent
Fang et al.

(10) Patent No.: US 12,103,853 B2
(45) Date of Patent: Oct. 1, 2024

(54) POLYCRYSTALLINE DIAMOND COMPACT TABLE WITH POLYCRYSTALLINE DIAMOND EXTENSIONS THEREFROM

(71) Applicant: SF Diamond Co., Ltd., Zhengzhou (CN)

(72) Inventors: Haijang Fang, Zhengzhou (CN);
Weifeng Du, Zhengzhou (CN);
Yongfeng Wang, Zhengzhou (CN);
Dongpeng Zhao, Zhengzhou (CN)

(73) Assignee: SF Diamond Co., Ltd., Zhengzhou (CN)

( * ) Notice: Subject to any disclaimer, the term of this patent is extended or adjusted under 35 U.S.C. 154(b) by 0 days.

(21) Appl. No.: 18/459,204

(22) Filed: Aug. 31, 2023

(65) Prior Publication Data

US 2023/0416098 A1    Dec. 28, 2023

Related U.S. Application Data

(62) Division of application No. 16/516,990, filed on Jul. 19, 2019, now Pat. No. 11,772,977.

(30) Foreign Application Priority Data

Jul. 10, 2019    (CN) .......................... 20190619927.6

(51) Int. Cl.
*E21B 10/50* (2006.01)
*C01B 32/25* (2017.01)
*E21B 10/48* (2006.01)

(52) U.S. Cl.
CPC ............ *C01B 32/25* (2017.08); *E21B 10/485* (2013.01); *E21B 10/50* (2013.01); *C01P 2002/90* (2013.01); *C01P 2006/90* (2013.01)

(58) Field of Classification Search
CPC . E21B 10/5673; E21B 10/567; E21B 10/5671
See application file for complete search history.

(56) References Cited

U.S. PATENT DOCUMENTS 4,109,737 A * 8/1978 Bovenkerk ......... E21B 10/5673
407/51
4,984,642 A    1/1991 Renard et al.
(Continued)

FOREIGN PATENT DOCUMENTS

CN    101280666 A    10/2008
CN    201202408 Y    3/2009
(Continued)

OTHER PUBLICATIONS

Zhao, Dongpeng et al., "Characterization of polycrystalline diamond compact with non-planar surfaces for drilling hard-formation", Diamond & Abrasives Engineering, Dec. 6, 2016, No. 6 vol. 36, Serial 216.
(Continued)

*Primary Examiner* — Shane Bomar
(74) *Attorney, Agent, or Firm* — PATENT LAW WORKS LLP

(57) ABSTRACT

A polycrystalline element includes a table formed of polycrystalline diamond. The table includes a first surface; a second surface spaced apart from the first surface; and at least one side extending between the first surface and the second surface. The table also includes a plurality of extensions also formed of polycrystalline diamond, wherein at least one extension of the plurality of extensions extends away from at least one of the first surface and the at least one side. A radial line extends radially outward from a center axis of the first surface intersects each of a long axis of a subset of a plurality of extensions. Optionally, the polycrystalline diamond of at least one extension of the plurality of extensions is contiguous with the polycrystalline diamond of (Continued)

the table. The polycrystalline element may be used in downhole tools for boring and well drilling, machine tools, and bearings.

26 Claims, 29 Drawing Sheets

(56) References Cited

U.S. PATENT DOCUMENTS

| | | | |
|---|---|---|---|
| 6,045,440 A | 4/2000 | Johnson et al. |
| 6,196,340 B1 | 3/2001 | Jensen et al. |
| 6,196,910 B1 | 3/2001 | Johnson et al. |
| 7,658,666 B2 | 2/2010 | Sung |
| 7,726,420 B2 | 6/2010 | Shen et al. |
| 7,798,257 B2 | 9/2010 | Shen |
| 8,191,657 B2 | 6/2012 | Richert |
| 8,210,747 B2 | 7/2012 | Cooley |
| 8,540,037 B2 | 9/2013 | Hall |
| 9,297,411 B2 | 3/2016 | Peterson et al. |
| 10,385,623 B2 | 8/2019 | DiGiovanni et al. |
| 2008/0121433 A1 | 5/2008 | Ledgerwood |
| 2013/0068538 A1 | 3/2013 | DiGiovanni et al. |
| 2014/0318873 A1 | 10/2014 | Patel |
| 2015/0259986 A1 | 9/2015 | Stockey |
| 2015/0285007 A1 | 10/2015 | Stockey et al. |
| 2015/0368981 A1 | 12/2015 | Jiang et al. |
| 2018/0291689 A1 | 10/2018 | Palmer |
| 2018/0318962 A1 | 11/2018 | Zhao et al. |
| 2018/0320450 A1 | 11/2018 | Borge |
| 2019/0084087 A1 | 3/2019 | Chapman et al. |
| 2019/0085641 A1 * | 3/2019 | Heaton .......... C22C 26/00 |

FOREIGN PATENT DOCUMENTS

| | | |
|---|---|---|
| CN | 202081828 U | 12/2011 |
| CN | 203905823 U | 10/2014 |
| CN | 204729011 U | 10/2015 |
| CN | 205259953 U | 5/2016 |
| CN | 205259954 U | 5/2016 |
| CN | 105772733 A | 7/2016 |
| CN | 105840104 A | 8/2016 |
| CN | 205422548 U | 8/2016 |
| CN | 205890048 U | 1/2017 |
| CN | 106761428 A | 5/2017 |
| CN | 106984906 A | 7/2017 |
| CN | 206458324 U | 9/2017 |
| CN | 206693924 U | 12/2017 |
| CN | 206870494 U | 1/2018 |
| CN | 206874228 U | 1/2018 |
| CN | 207110976 U | 3/2018 |
| CN | 207453880 U | 6/2018 |
| CN | 207673290 U | 7/2018 |

OTHER PUBLICATIONS

Zhao, Dongpeng et al., "Research of polycrystalline diamond compact having non-planar surfaces for oil drilling", Diamond & Abrasives Engineering, Dec. 6, 2017, No. 6 vol. 37, Serial 222.

* cited by examiner

POLYCRYSTALLINE DIAMOND COMPACT TABLE WITH POLYCRYSTALLINE DIAMOND EXTENSIONS THEREFROM

PRIORITY CLAIM

This application is a divisional application of U.S. patent application Ser. No. 16/516,990 entitled "Polycrystalline Diamond Compact Table With Polycrystalline Diamond Extensions Therefrom" filed on Jul. 19, 2019, which in turn claims the benefit of and priority to Chinese Patent Application No. 201910619927.6 entitled "Polycrystalline Diamond Compact Table With Polycrystalline Diamond Extensions Therefrom" filed on Jul. 10, 2019, which are incorporated in their entirety for all purposes by this reference.

FIELD

The present application relates to polycrystalline elements that include a table formed of polycrystalline diamond. The table also includes a plurality of extensions also formed of polycrystalline diamond, wherein at least one extension of the plurality of extensions extends away from at least one of the first surface and the at least one side. The polycrystalline element may be used in downhole tools for boring and well drilling of water wells; oil and gas wells; injection wells; geothermal wells; monitoring wells, mining; and, other operations in which a well-bore is drilled into the Earth. The polycrystalline elements may also be used in machine tools and bearings.

BACKGROUND

Specialized drill bits and other downhole tools are used to drill well-bores, boreholes, or wells in the earth for a variety of purposes, including water wells; oil and gas wells; injection wells; geothermal wells; monitoring wells, mining; and, other similar operations. Referring specifically to drill bits, the bits come in two common types, roller cone drill bits and fixed cutter drill bits.

Wells and other holes in the earth are drilled by attaching or connecting a drill bit to some structure or method of turning the drill bit. In some instances, such as in some mining applications, the drill bit is attached directly to a shaft that is turned by a motor, engine, drive, or other source of torque capable of rotating the drill bit.

In other applications, such as oil and gas drilling, the well may be several thousand feet or more in total depth. In these circumstances, the drill bit is connected to the surface of the earth by what is referred to as a drill string and a motor or drive that rotates the drill bit. The drill string typically comprises several elements that may include a special down-hole motor configured to provide additional or, if a surface motor or drive is not provided, the only means of turning the drill bit. Special logging and directional tools to measure various physical characteristics of the geological formation being drilled and to measure the location of the drill bit and drill string may be employed. Additional drill collars, heavy, thick-walled pipe, typically provide weight that is used to push the drill bit into the formation. Finally, drill pipe connects these elements, the drill bit, down-hole motor, logging tools, and drill collars, to the surface where a motor or drive mechanism turns the entire drill string and, consequently, the drill bit, to engage the drill bit with the geological formation to drill the well-bore deeper.

As a well is drilled, fluid, typically a water or oil based fluid referred to as drilling mud is pumped down the drill string through the drill pipe and any other elements present and through the drill bit. Other types of drilling fluids are sometimes used, including air, nitrogen, foams, mists, and other combinations of gases, but for purposes of this application drilling fluid and/or drilling mud refers to any type of drilling fluid, including gases. In other words, drill bits typically have a fluid channel within the drill bit to allow the drilling mud to pass through the bit and out one or more jets, ports, or nozzles. The purpose of the drilling fluid is to cool and lubricate the drill bit, stabilize the well-bore from collapsing or allowing fluids present in the geological formation from entering the well-bore, and to carry fragments or cuttings removed by the drill bit up the annulus and out of the well-bore. While the drilling fluid typically is pumped through the inner annulus of the drill string and out of the drill bit, drilling fluid can be reverse-circulated. That is, the drilling fluid can be pumped down the annulus (the space between the exterior of the drill pipe and the wall of the well-bore) of the well-bore, across the face of the drill bit, and into the inner fluid channels of the drill bit through the jets or nozzles and up into the drill string.

Roller cone drill bits were the most common type of bit used historically and featured two or more rotating cones with cutting elements, or teeth, on each cone. Roller cone drill bits typically have a relatively short period of use as the cutting elements and support bearings for the roller cones typically wear out and fail after only 50 hours of drilling use. The teeth or cutting elements of roller cone bits typically are formed of hard materials, such as steel and tungsten carbide. The action by which roller cone bits work is by applying relatively high force (weight-on-bit) so that the teeth gouge and crush the rock formation.

Because of the relatively short life of roller cone bits, fixed cutter drill bits that employ very durable polycrystalline diamond compact (PDC) cutters, tungsten carbide cutters, natural or synthetic diamond, other hard materials, or combinations thereof, have been developed. These bits are referred to as fixed cutter bits because they employ cutting elements positioned on one or more fixed blades in selected locations or randomly distributed. Unlike roller cone bits that have cutting elements on a cone that rotates, in addition to the rotation imparted by a motor or drive, fixed cutter bits do not rotate independently of the rotation imparted by the motor or drive mechanism. In contrast to roller cone bits that gouge or crush the formation, PDC cutters act by scraping or shearing the formation.

Through varying improvements, the durability of fixed cutter bits with planar PCD elements and cutters has improved sufficiently to make them cost effective in terms of time saved during the drilling process when compared to the higher, up-front cost to manufacture the fixed cutter bits.

PCD elements also may be used in various machine tools, such as planes, mills, drills, and lathes.

PCD elements also have been used as bearing surfaces in various bearings, typically those that endure both rotational and thrust forces. PCD elements may be well suited because of their relatively lower coefficient of friction and durability.

Despite many years of improvements, typical planar PCD elements may suffer from chipping and spalling because of the high heat generated by the shearing action. In addition, shearing may not always be the most efficient mechanism by which to degrade various formations or work materials. In other words, the planar shape and shearing action may not be able to provide a crushing or gouging action that might more efficiently cut a formation or a work material.

Furthermore, with respect to bearings, the planar surface may not allow for efficient cooling of the PCD element, leading to excessive heat that could lead to premature failure of the PCD element and, consequently the bearing.

Thus, there exists a need for a cost-effective and improved PCD element for use as a cutting element in downhole tools, machine tools, and bearing surfaces.

SUMMARY

Embodiments of a polycrystalline element include a table comprising polycrystalline diamond. For purposes of this application, polycrystalline diamond encompasses both cubic boron nitride (CBN), polycrystalline diamond (PCD), and other ultrahard materials compatible for use or as a substitute for CBN or PCD. Typically, these materials are synthetic powders sintered at high-pressure and high-temperature to form a polycrystalline diamond compact or table as known in the art.

The table includes a first surface, typically a bearing surface or a cutting surface, depending on the application. The table also includes a second surface spaced apart from the first surface and at least one side extending between the first surface and the second surface.

In addition, the polycrystalline element includes a plurality of extensions comprising polycrystalline diamond, wherein at least one extension of the plurality of extensions extends away from at least one of the first surface and the at least one side.

Optionally, the polycrystalline element includes any one or more of the following features in any combination. Stated differently, none of the following features are mutually exclusive of other features, nor are any of the following features required in any combination with any other feature or features.

At least one extension of the plurality of extensions may extend away from the at least one side.

Optionally, the polycrystalline diamond of at least one extension of the plurality of extensions may be contiguous with the polycrystalline diamond of the table. In other words, the at least one extension may be formed of a piece or as an integral portion of the first surface.

Optionally, at least one extension of the plurality of extensions is spaced apart from at least one adjacent extension. A fluid flow path may be defined by the space between the at least one extension and at least another extension. The fluid flow path may allow drilling fluid (whether a liquid or a gas, water-based, oil-based, or synthetic, lubricants, and other fluids) to cool, to lubricate, and to clean debris or cuttings from the polycrystalline element.

At least a portion of the first surface may be one of spherical, hemi-spherical, cylindrical, planar, conical, frusto-conical, and polyhedral in shape.

At least one extension of the plurality of extensions may include a long axis that intersects at least one of the first surface and the side at an angle between 0 degrees to 90 degrees, 10 degrees to 80 degrees, 20 degrees to 70 degrees, 30 degrees to 60 degrees, and 40 to 50 degrees, or any specific angle or subrange within these recited ranges. At least one extension of the plurality of extensions may have a long axis that intersects the first surface at an angle or a range of angles that is different from the angle or the range of angles that at least another extension of the plurality of extensions intersects the first surface. The polycrystalline element optionally may further be defined by a radial line that extends radially outward from a center axis of the first surface that intersects each of the long axis of a subset of the plurality of extensions (As one of skill in the art would appreciate, this radial line does not exist in reality but is used to describe the physical orientation and act as a landmark for the geographic discussion of the subset of the plurality of extensions).

At least one extension of the plurality of extensions may include an end spaced apart from the first surface, wherein the end includes a curved surface.

Optionally, at least one extension of the plurality of extensions includes a first portion that is at least one of spherical, hemi-spherical, cylindrical, conical, frusto-conical, polyhedral, tear-dropped, and irregular shaped. The at least one extension of the plurality of extensions may also include a second portion positioned at an end of the first portion, wherein the second portion extends a distance away from the first surface. The second portion may be at least one of spherical, hemi-spherical, cylindrical, conical, frusto-conical, polyhedral, tear-dropped, and irregular shaped.

At least one extension of the plurality of extensions may include a height that is different from another height of at least another extension of the plurality of extensions. Similarly, each extension in at least a subset of the plurality of extensions includes a furthest most point from the first surface, and wherein when the subset of the plurality of extensions is viewed in profile, a profile line intersects each furthest most point of each extension within the subset of the plurality of extensions, and wherein the profile line intersects a horizontal line coincident with the first surface.

The first surface may include at least one chamfered surface. Stated differently, the chamfered surface is part of, or a portion or subset of, the first surface. In some instances, the first surface may include a plurality of chamfered surfaces. Optionally, at least one extension of the plurality of extensions extends away from the at least one chamfered surface.

The polycrystalline element may further include a raised portion comprising polycrystalline diamond that extends adjacent to at least a first set of the plurality of extensions and a second set of the plurality of extensions. Optionally, the raised portion may be positioned between all or one or more subsets of the plurality of extensions. The polycrystalline diamond of the raised portion may be contiguous and/or integral with the polycrystalline diamond of the first surface. The raised portion may also include a raised portion surface that is at least one of planar, spherical, hemi-spherical, cylindrical, conical, frusto-conical, polyhedral, tear-dropped, and irregular shaped.

The polycrystalline element may further include at least one groove extending at least partially into at least one of the first surface and the at least one side.

The plurality of extensions may form various patterns. For example, the plurality of extensions may form a spiral pattern that begins with at least one extension positioned closest to a center of the first surface, a concentric pattern around a center of the first surface, and others. At least a first subset of the plurality of extensions may be spaced apart from and parallel to at least a second subset of the plurality of extensions.

The polycrystalline element may further include a substrate to which it is coupled to the second surface of the table. The substrate may, for example, be a carbide substrate although other substrates may be used or no substrate at all may be used in those instances in which the polycrystalline element stands alone or is coupled directly to another component, such as a drill bit, machine tool, or a bearing. Thus, the substrate may be an optional and non-essential part of the polycrystalline element except as recited in the dependent claims. The carbide substrate may be bonded to the polycrystalline element via any known method, including pressing, brazing, sintering, adhering with a variety of adhesives, and other known methods. The second surface may include any variety of locking and/or alignment features, slots, keys, crenellations, grooves, knobs, nodules, and other such features to engage with complementary features on the carbide substrate.

The polycrystalline element may be formed by a process that includes at least one of laser machining, electro-discharge machining, electro-discharge grinding, and pressing (such as in a poly-axial press and other methods of pressing) and other methods capable of forming the features, preferably from an integral piece of polycrystalline diamond that is used to form the table and at least one extension.

Further embodiments include a downhole tool that includes at least one polycrystalline element incorporating one or more of the features as described above. The downhole tool may be one of a roller cone bit, a fixed blade bit, a bi-center drill bit, a hole opener, a reamer, and a mill. Optionally, the various embodiments of the disclosed polycrystalline elements may be a cutting element (primary and/or backup cutting element), wear resistant element (such as a gauge protection features or elements), stand-off elements, and the like.

A machine tool for use in at least one of a plane, a mill, a drill, and a lathe may include at least one polycrystalline element incorporating one or more of the features as described above.

A bearing may include at least one polycrystalline element incorporating one or more of the features as described above.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Various embodiments of the present inventions are set forth in the attached figures and in the Detailed Description as provided herein and as embodied by the claims. It should be understood, however, that this Summary does not contain all of the aspects and embodiments of the one or more present inventions, is not meant to be limiting or restrictive in any manner, and that the invention(s) as disclosed herein is/are and will be understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

To further clarify the above and other advantages and features of the one or more present inventions, reference to specific embodiments thereof are illustrated in the appended drawings. The drawings depict only typical embodiments and are therefore not to be considered limiting. One or more embodiments will be described and explained with additional specificity and detail through the use of the accompanying drawings in which.

Common element numbers represent common features, even if the appearance of a feature varies slightly between the figures.

The drawings are not necessarily to scale.

DETAILED DESCRIPTION

Figure 1:
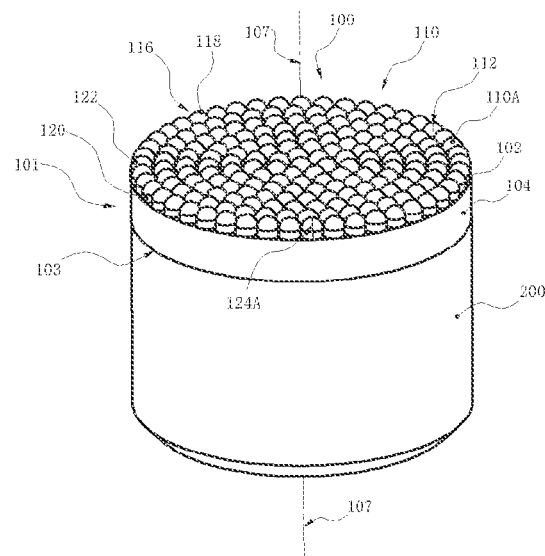
FIG. 1 discloses an example of a polycrystalline element as described in the summary.
Figure 2:
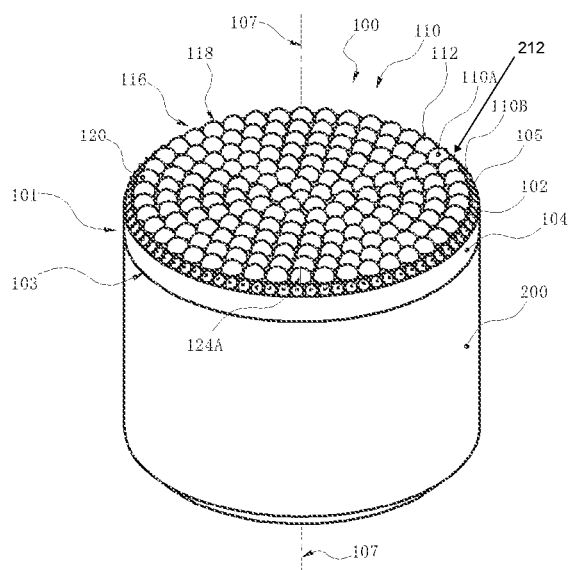
FIG. 2 discloses another example of a polycrystalline element as described in the summary.
Figure 53A:
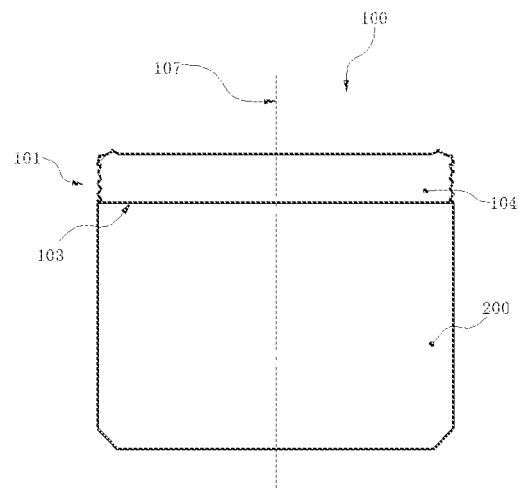
FIG. 53A discloses another example of a polycrystalline element as described in the summary.
Figure 53B:
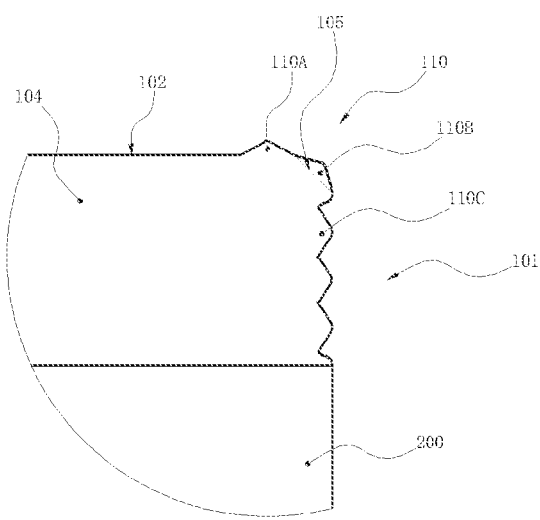
FIG. 53B is a close-up view of the polycrystalline element in FIG. 53A.

FIGS. 1-53A and 53B illustrate various views and examples of a polycrystalline element 100 as described more generally in the summary above. The polycrystalline element 100 may include any one or more of the following features in any combination as one of skill in the art would understand, even if a particular combination is not specifically recited or illustrated. None of the features described below is mutually exclusive of another feature, nor is any feature described below required to be in any combination with any other feature described below. Stated yet differently, while many of the features will be described with respect to FIG. 1, any of those features described with respect to FIG. 1 may be used with any of the other examples of the polycrystalline elements 100 in any of the other figures, regardless of whether or not the feature is expressly recited in the relevant text or the relevant figure. Likewise, any of the features described in any of the polycrystalline elements 100 in any of FIGS. 2-53A and 53B may be used with the polycrystalline element 100 in FIG. 1, regardless of whether or not the feature is expressly recited in the relevant text or the relevant drawing.

Embodiments of a polycrystalline element 100 include a table 101 comprising polycrystalline diamond. For purposes of this application, polycrystalline diamond encompasses both cubic boron nitride (CBN), polycrystalline diamond (PCD), and other ultrahard materials compatible for use or as a substitute for CBN or PCD. Typically, these materials are synthetic powders sintered at high-pressure and high-temperature to form a polycrystalline diamond compact or table as known in the art.

Referring to FIGS. 1-53A and 53B, the table 101 includes a first surface 102, typically a bearing surface or a cutting surface, depending on the application as will be discussed below. The table 101 also includes a second surface 103 spaced apart from the first surface 102 and at least one side 104 extending between the first surface 102 and the second surface 103.

In addition, the polycrystalline element 101 includes a plurality of extensions 110 comprising polycrystalline diamond, wherein at least one extension 110A of the plurality of extensions 110 extends away from at least one of the first surface 102 and the at least one side 103. Optionally, any number of the extensions, including all of the plurality of extensions 110 may extend away from at least one of the first surface 102 and the at least one side 103.

The polycrystalline diamond of at least one extension of the plurality of extensions 110 is contiguous with and, optionally, formed integrally with the polycrystalline diamond of the table 101.

At least one extension 110A of the plurality of extensions 110 may be spaced apart from at least one adjacent extension 110B, which optionally may define a fluid flow path 212 therebetween to allow a fluid, such as drilling fluid and/or lubricant to pass therethrough so as to provide one or more of cooling, lubricating, and cleaning of debris (e.g., cuttings) from the area around the plurality of extensions 110 and the polycrystalline element 100.

Figure 17:
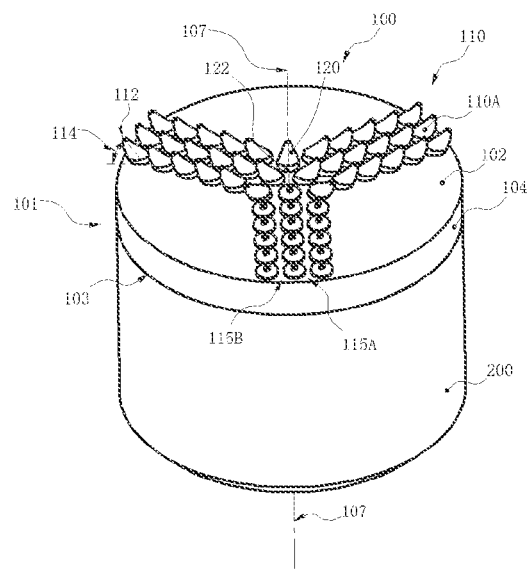
FIG. 17 discloses another example of a polycrystalline element as described in the summary.
Figure 18:
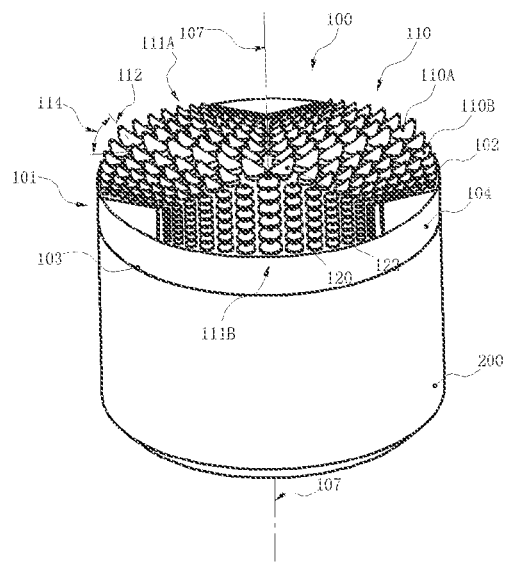
FIG. 18 discloses another example of a polycrystalline element as described in the summary.

At least one extension 110A of the plurality of extensions 110 may include a long axis 112 that intersects at least one of the first surface 102 and the at least one side 103 at an angle 114 between 0 degrees to 90 degrees relative to the first surface and the side, respectively, as illustrated in at least FIG. 17. Optionally, the angle 114 may be within any subrange of 0 degrees to 90 degrees, such as 10 degrees to 80 degrees, 20 degrees to 70 degrees, 30 degrees to 60 degrees, and 40 to 50 degrees, or any specific angle or subrange within these recited ranges. At least one extension of the plurality of extensions may have a long axis that intersects the first surface at an angle or a range of angles that is different from the angle or the range of angles that at least another extension of the plurality of extensions intersects the first surface.

Optionally, and as illustrated in at least FIG. 1, at least one extension of the plurality of extensions 110 includes an end 116 spaced apart from the first surface 102, wherein the end 116 includes a curved surface 118.

Figure 5:
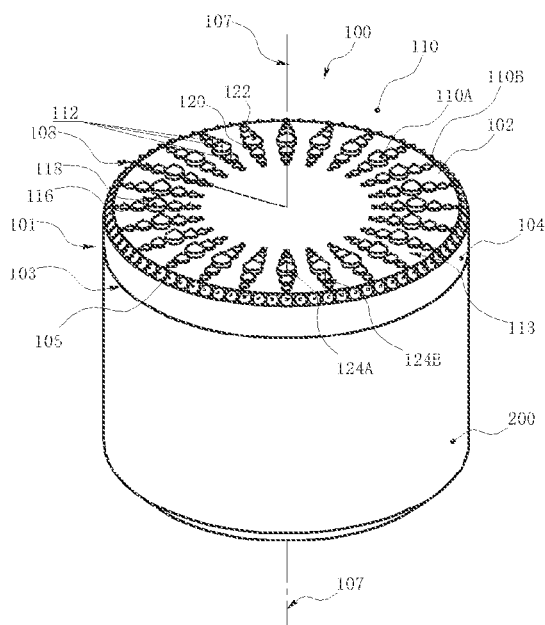
FIG. 5 discloses another example of a polycrystalline element as described in the summary.
Figure 6:
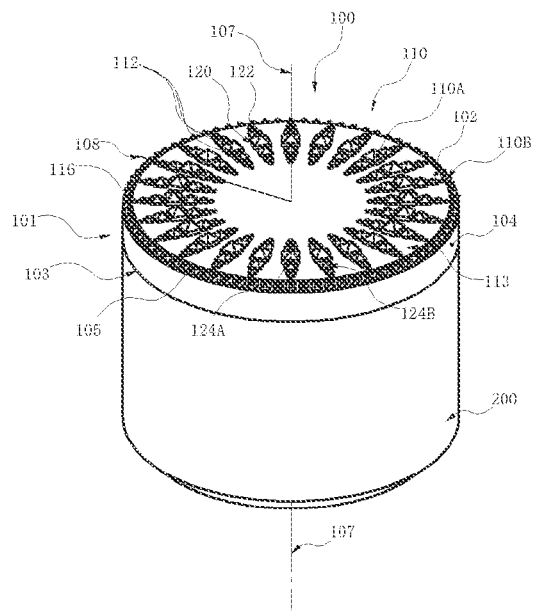
FIG. 6 discloses another example of a polycrystalline element as described in the summary.
Figure 7:
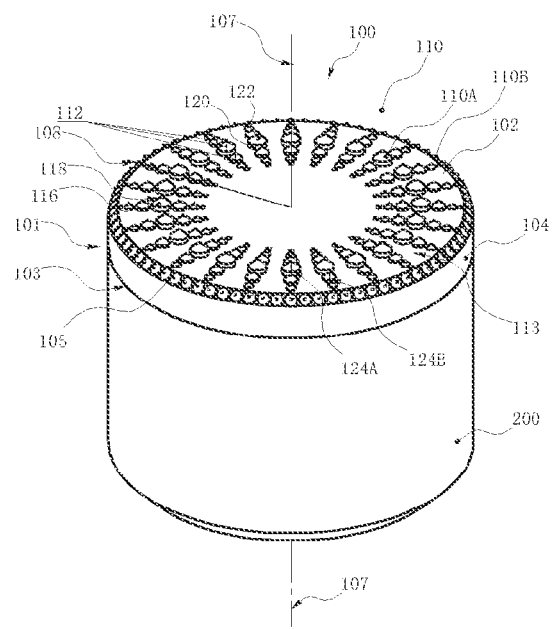
FIG. 7 discloses another example of a polycrystalline element as described in the summary.
Figure 9:
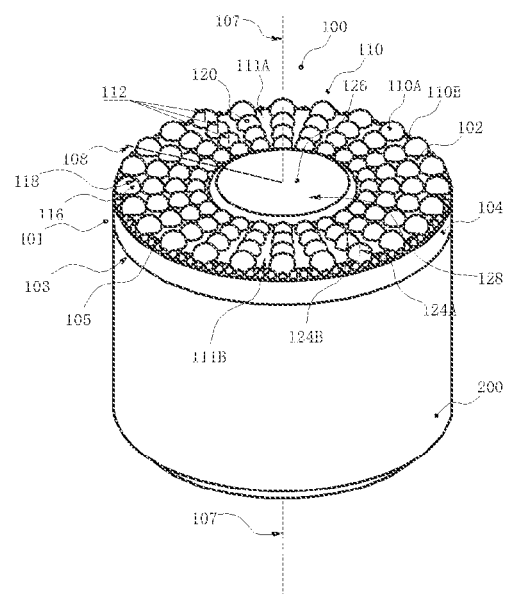
FIG. 9 discloses another example of a polycrystalline element as described in the summary.
Figure 10:
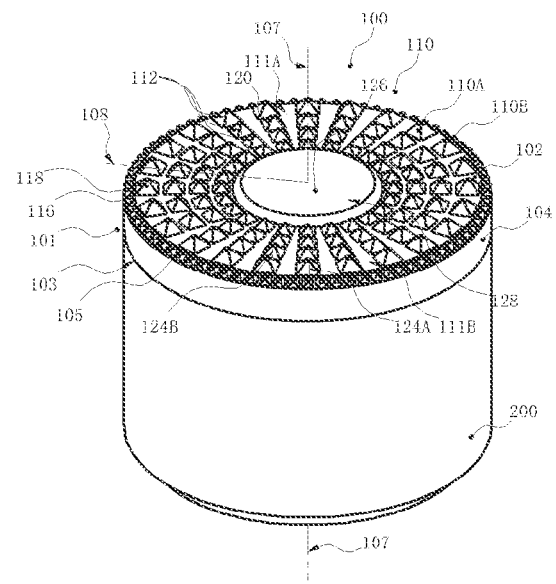
FIG. 10 discloses another example of a polycrystalline element as described in the summary.
Figure 11:
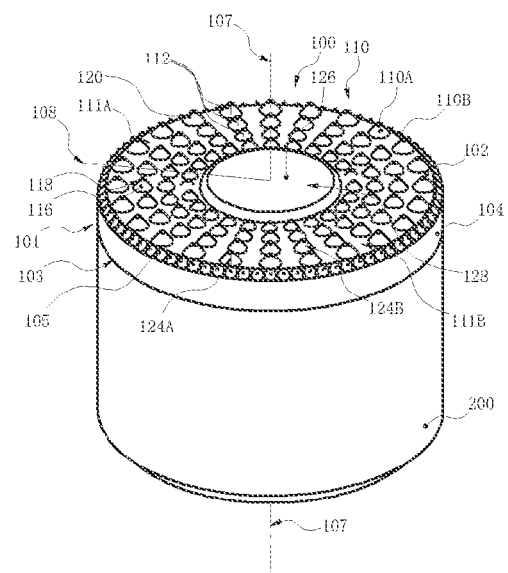
FIG. 11 discloses another example of a polycrystalline element as described in the summary.
Figure 12:
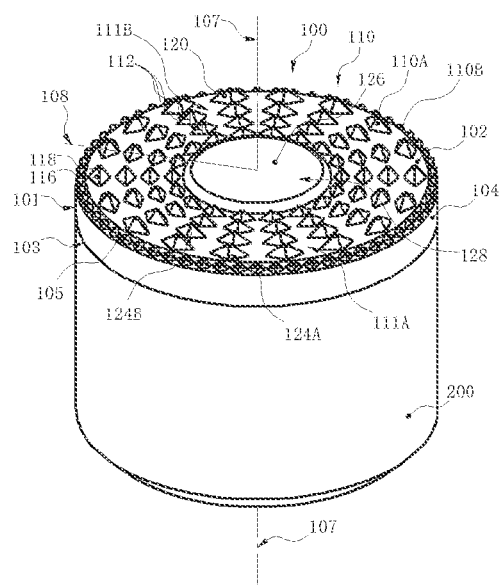
FIG. 12 discloses another example of a polycrystalline element as described in the summary.
Figure 13:
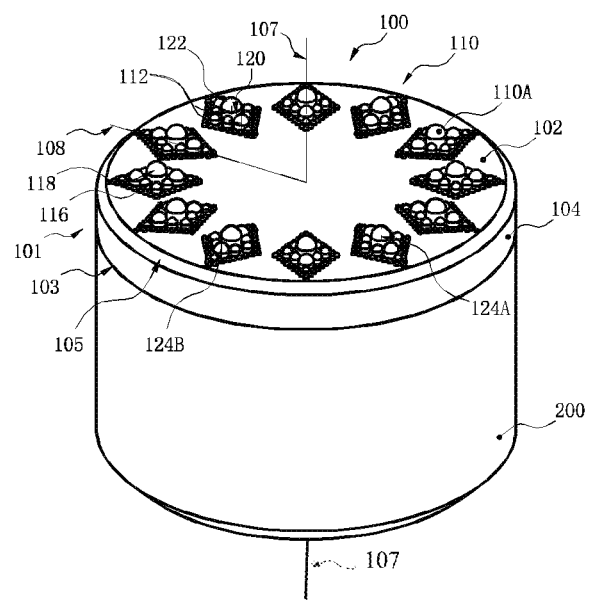
FIG. 13 discloses another example of a polycrystalline element as described in the summary.
Figure 14:
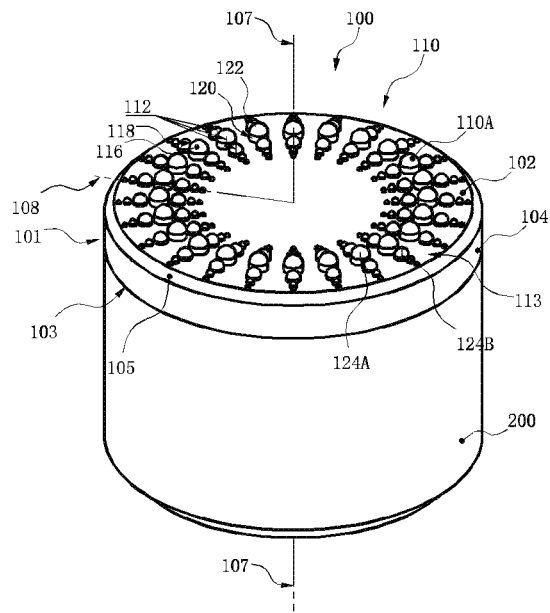
FIG. 14 discloses another example of a polycrystalline element as described in the summary.
Figure 15:
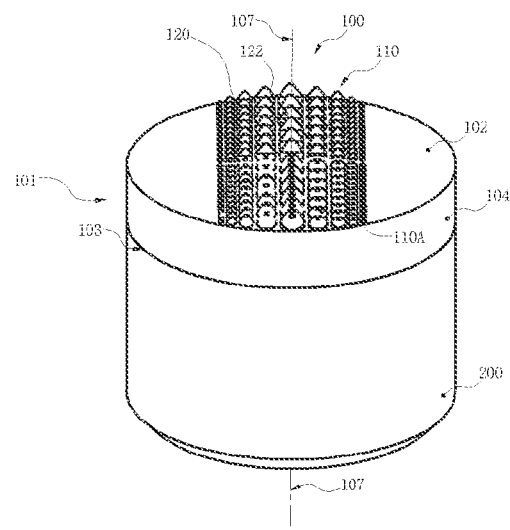
FIG. 15 discloses another example of a polycrystalline element as described in the summary.
Figure 16:
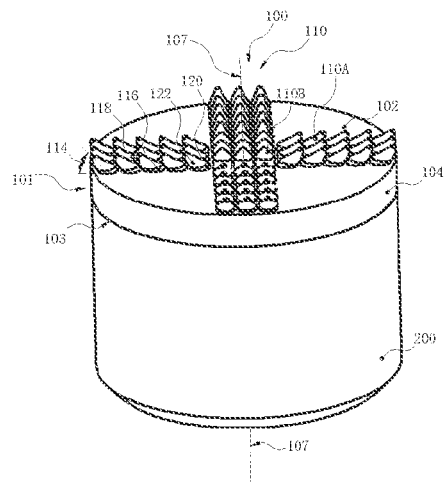
FIG. 16 discloses another example of a polycrystalline element as described in the summary.
Figure 19:
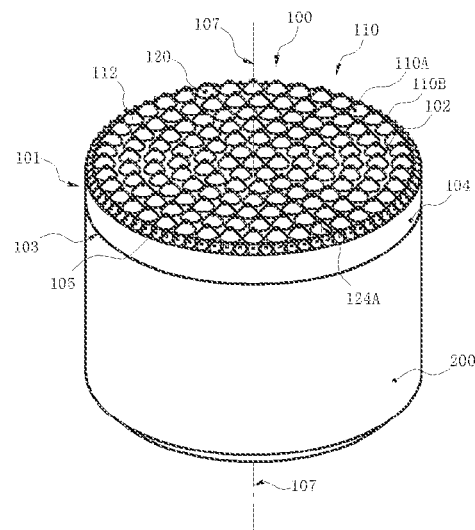
FIG. 19 discloses another example of a polycrystalline element as described in the summary.
Figure 20:
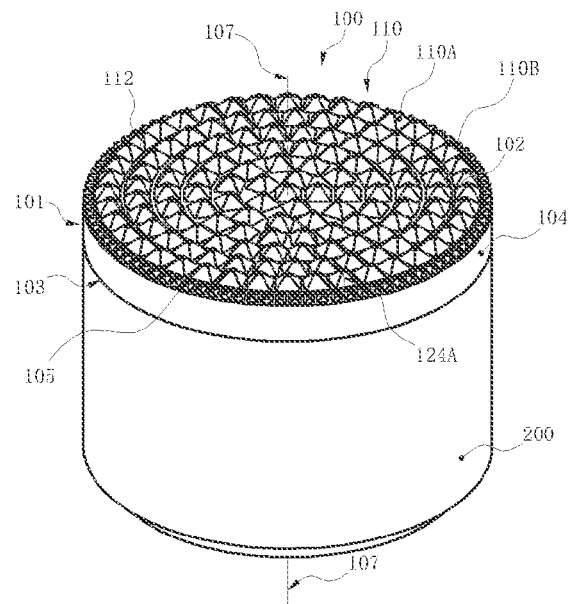
FIG. 20 discloses another example of a polycrystalline element as described in the summary.
Figure 21:
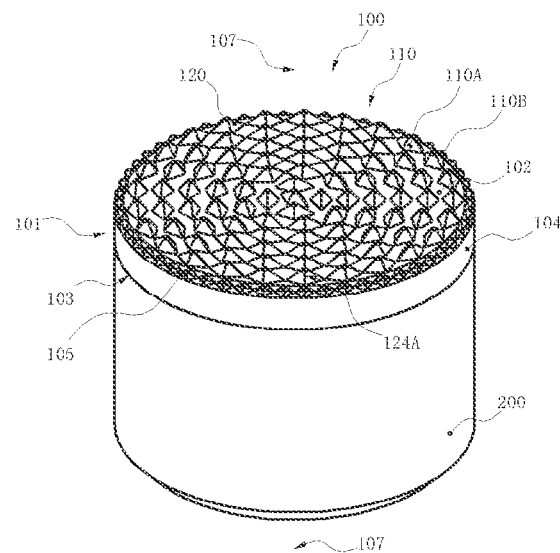
FIG. 21 discloses another example of a polycrystalline element as described in the summary.
Figure 22:
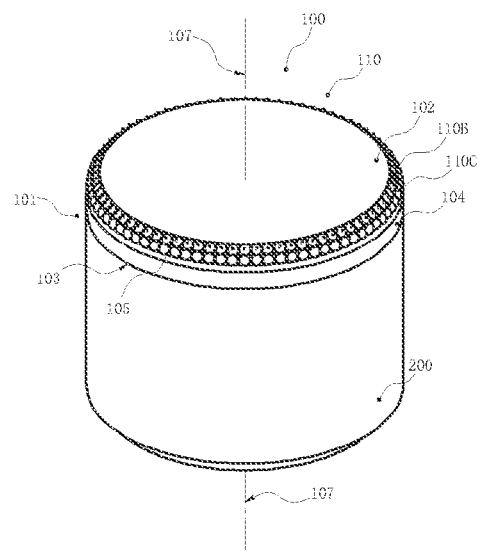
FIG. 22 discloses another example of a polycrystalline element as described in the summary.
Figure 23:
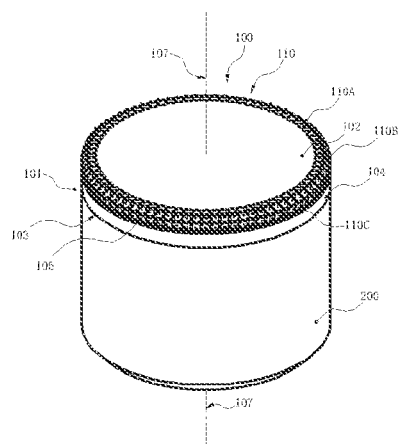
FIG. 23 discloses another example of a polycrystalline element as described in the summary.
Figure 24:
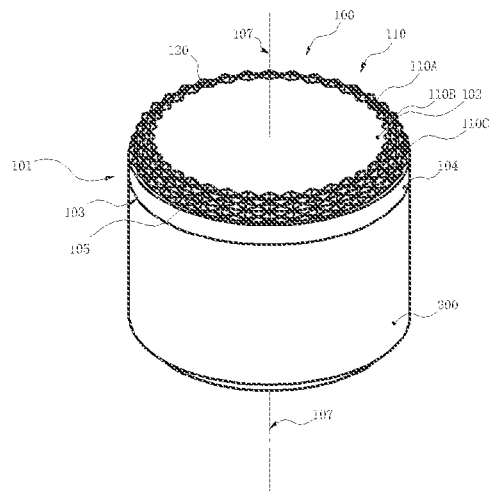
FIG. 24 discloses another example of a polycrystalline element as described in the summary.
Figure 32:
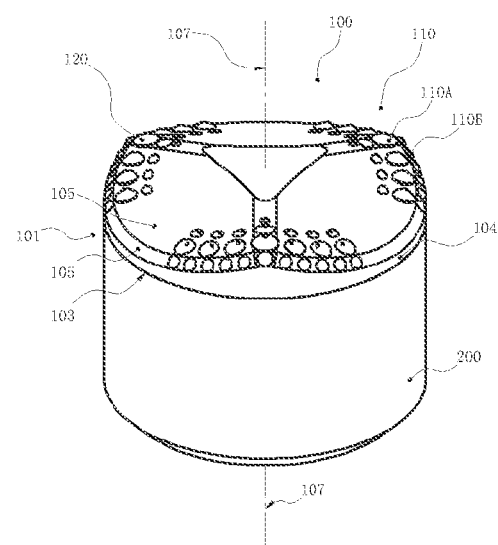
FIG. 32 discloses another example of a polycrystalline element as described in the summary.
Figure 37:
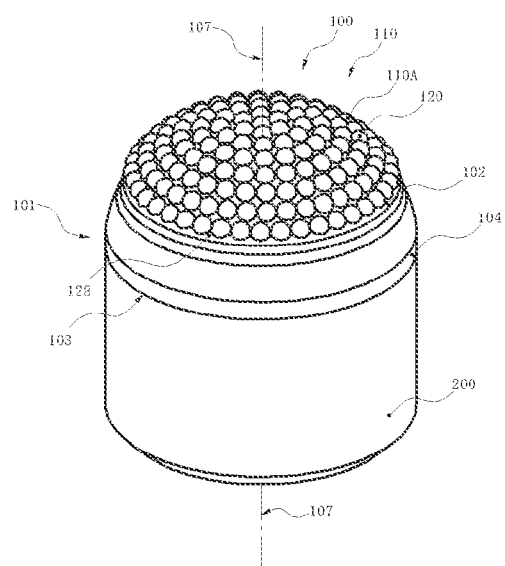
FIG. 37 discloses another example of a polycrystalline element as described in the summary.
Figure 38:
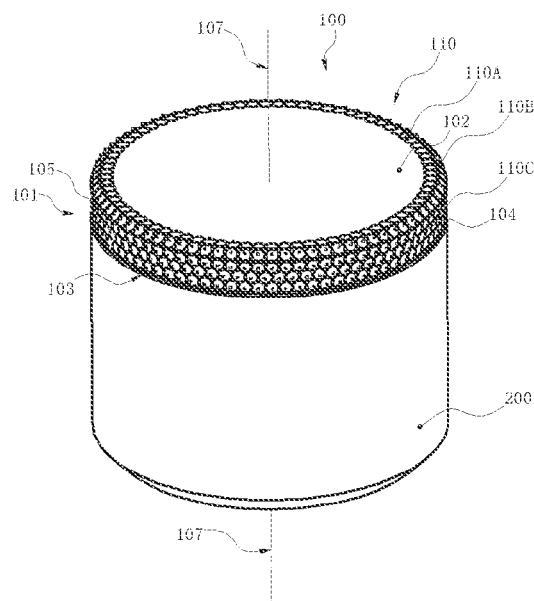
FIG. 38 discloses another example of a polycrystalline element as described in the summary.
Figure 41:
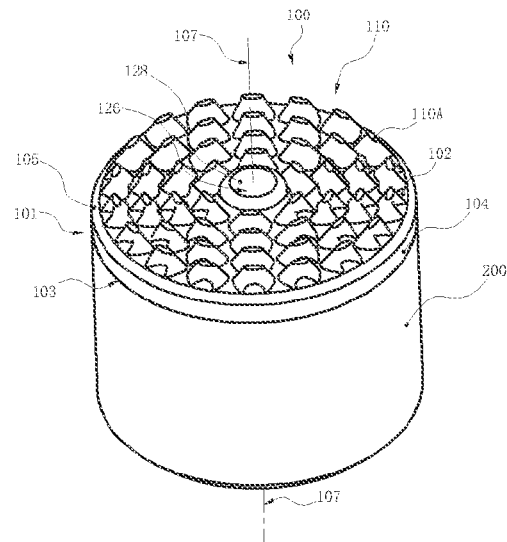
FIG. 41 discloses another example of a polycrystalline element as described in the summary.
Figure 42:
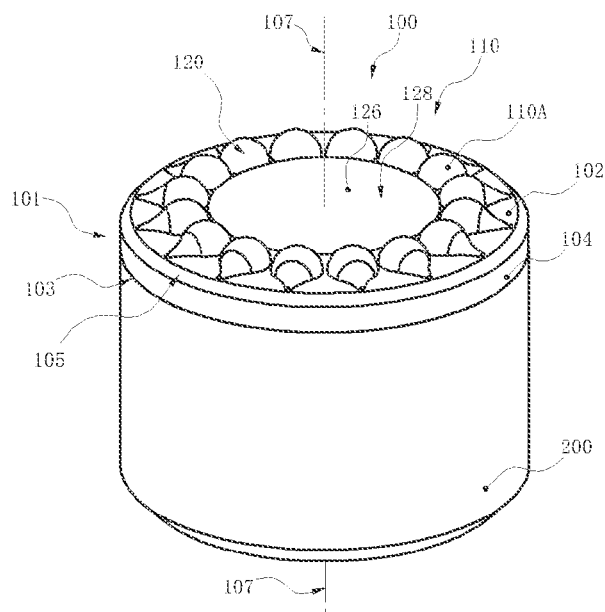
FIG. 42 discloses another example of a polycrystalline element as described in the summary.
Figure 43:
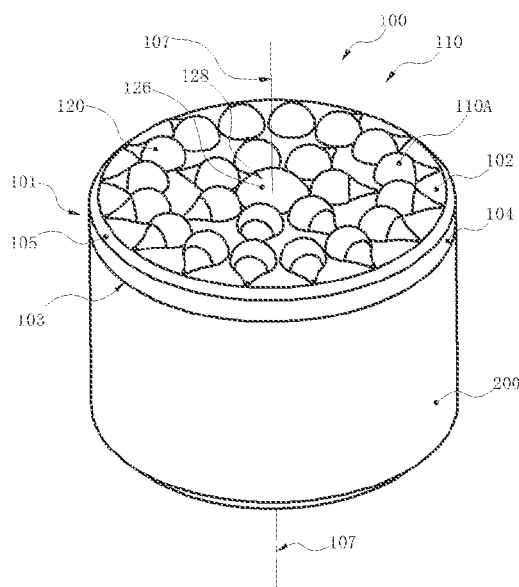
FIG. 43 discloses another example of a polycrystalline element as described in the summary.
Figure 44:
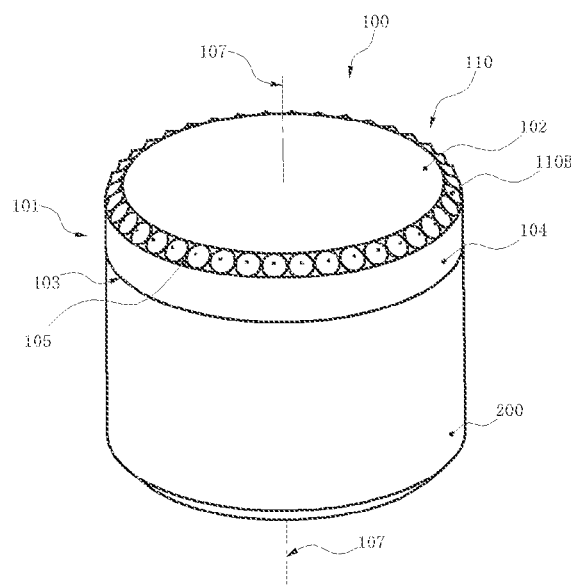
FIG. 44 discloses another example of a polycrystalline element as described in the summary.
Figure 45:
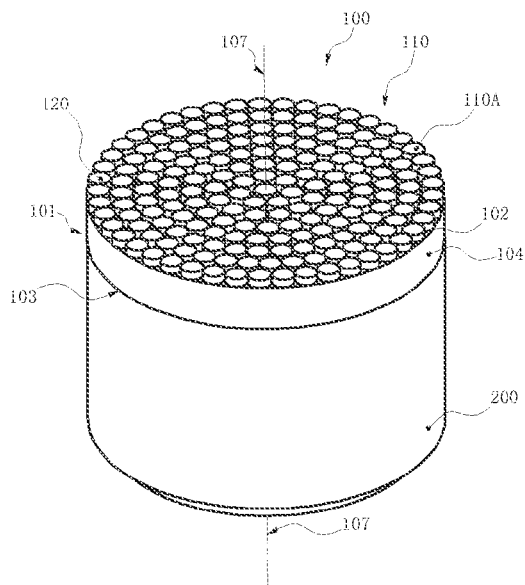
FIG. 45 discloses another example of a polycrystalline element as described in the summary.
Figure 46:
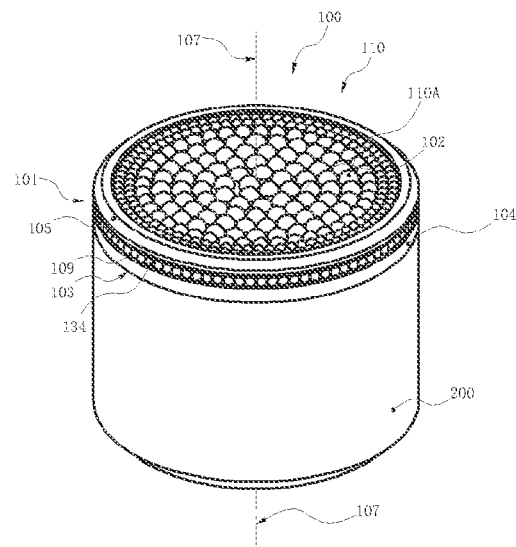
FIG. 46 discloses another example of a polycrystalline element as described in the summary.
Figure 47:
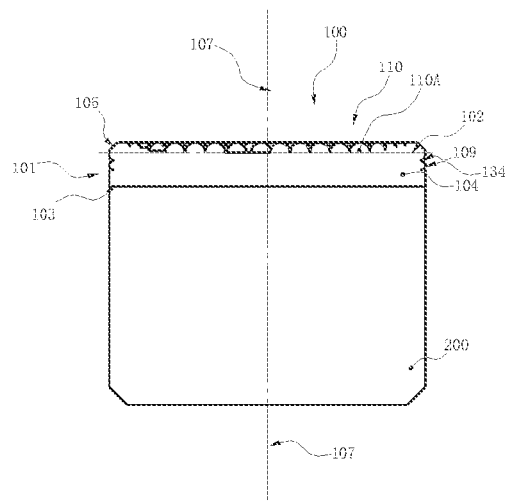
FIG. 47 is a cross-section view of the polycrystalline element in FIG. 46.
Figure 48:
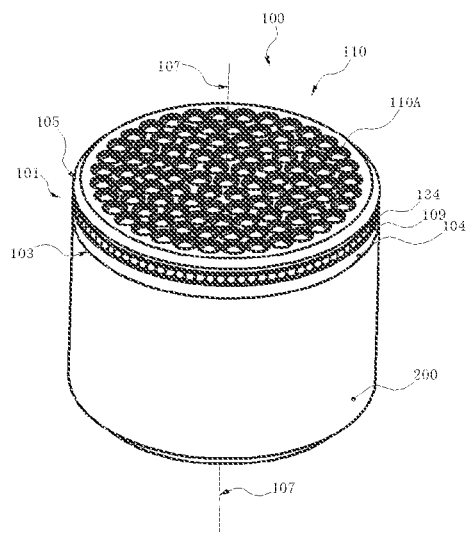
FIG. 48 discloses another example of a polycrystalline element as described in the summary.
Figure 49:
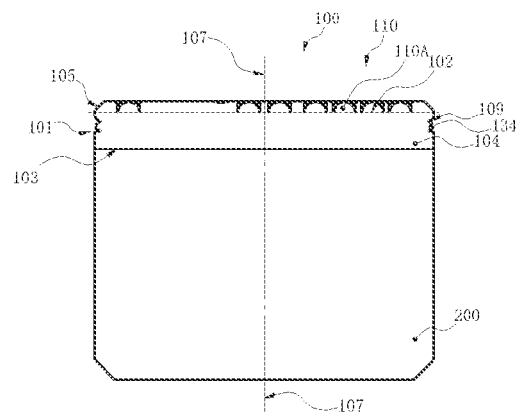
FIG. 49 is a cross-section view of the polycrystalline element in FIG. 48.

At least one extension 110A of the plurality of extensions 110 may include a first portion 120 that is at least one of spherical (e.g., FIGS. 25, 37, and 42), hemi-spherical (e.g., FIGS. 2 and 9), cylindrical (e.g., FIG. 5), conical (e.g., FIGS. 15 and 19), frusto-conical (e.g., FIG. 32), polyhedral (e.g., FIG. 12), tear-dropped (e.g., FIG. 42), and irregular shaped (e.g., FIG. 41).

Figure 8:
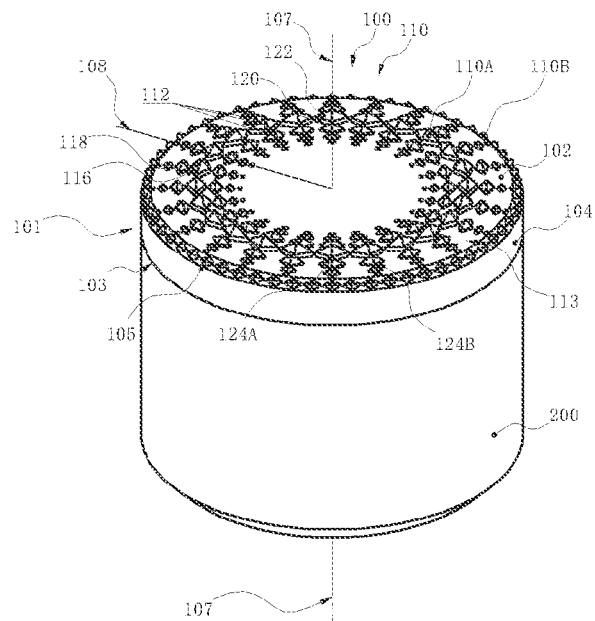
FIG. 8 discloses another example of a polycrystalline element as described in the summary.
Figure 25:
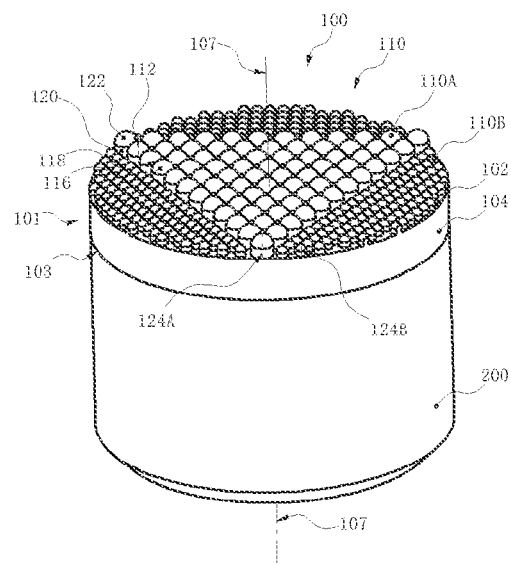
FIG. 25 discloses another example of a polycrystalline element as described in the summary.

Optionally, the at least one extension 110A of the plurality of extensions 110 includes a second portion 122 positioned at an end of the first portion 120, wherein the second portion 122 extends a distance away from the first surface 102 (e.g., FIG. 25). The second portion 122 may be at least one of spherical, hemi-spherical, cylindrical (e.g., FIG. 25), conical, frusto-conical, polyhedral (e.g., FIG. 8), tear-dropped, and irregular shaped.

Figure 26:
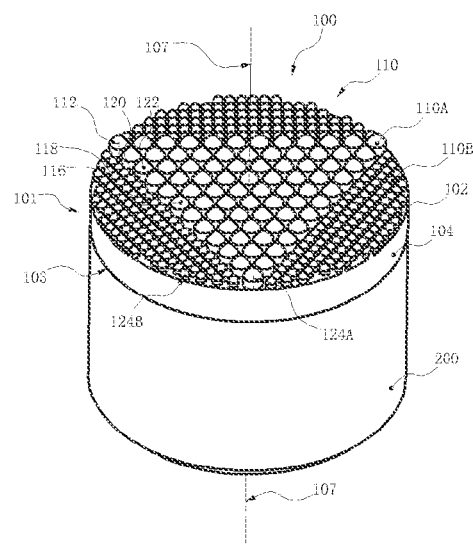
FIG. 26 discloses another example of a polycrystalline element as described in the summary.
Figure 27:
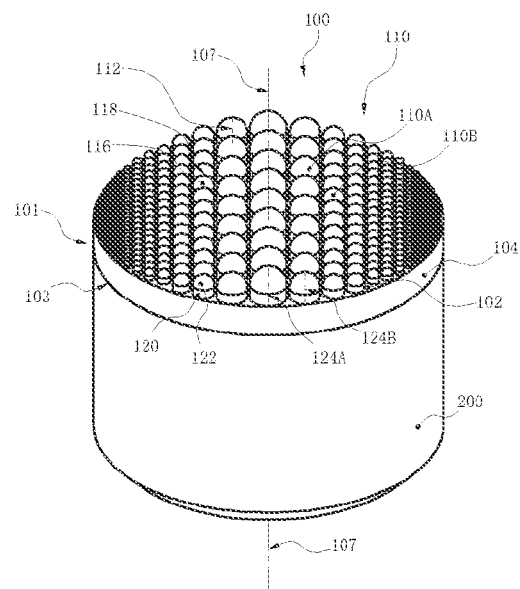
FIG. 27 discloses another example of a polycrystalline element as described in the summary.
Figure 28:
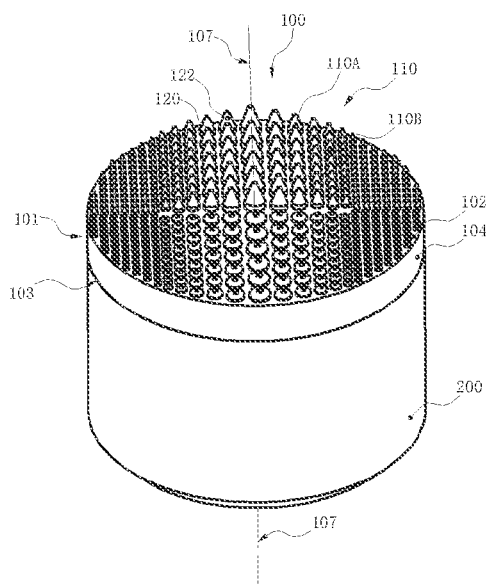
FIG. 28 discloses another example of a polycrystalline element as described in the summary.
Figure 29:
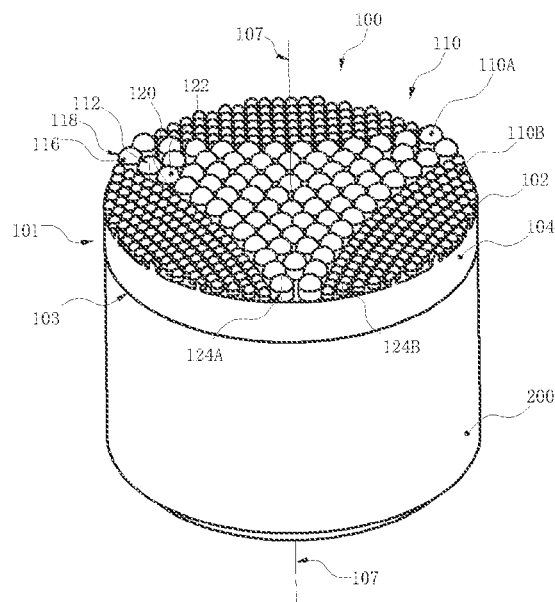
FIG. 29 discloses another example of a polycrystalline element as described in the summary.
Figure 30:
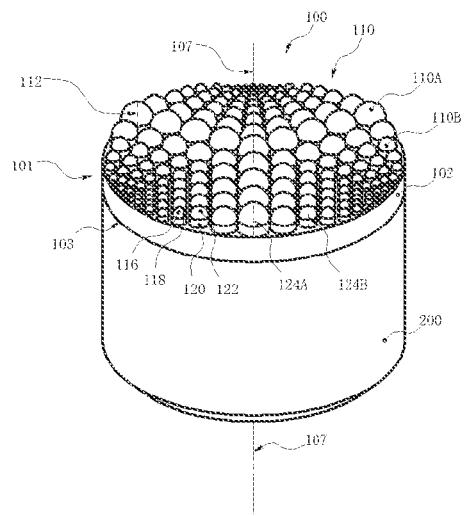
FIG. 30 discloses another example of a polycrystalline element as described in the summary.
Figure 31:
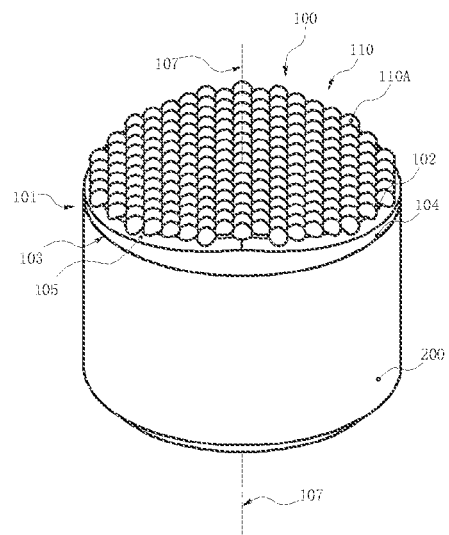
FIG. 31 discloses another example of a polycrystalline element as described in the summary.

Optionally, at least one extension 110A of the plurality of extensions 100 includes a height 124A that is different from another height 124B of at least another extension 110B of the plurality of extensions 110, as illustrated in, for example, FIG. 26.

Figure 33:
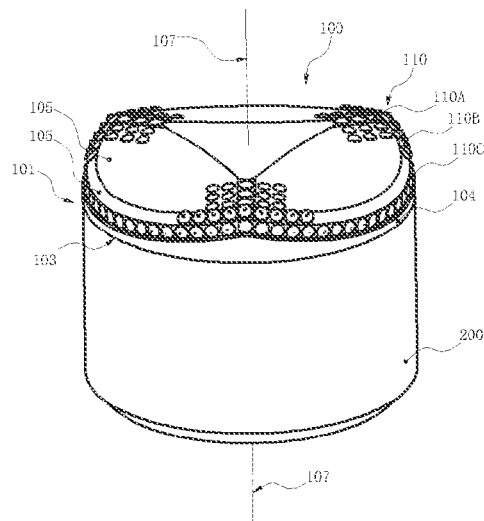
FIG. 33 discloses another example of a polycrystalline element as described in the summary.
Figure 34:
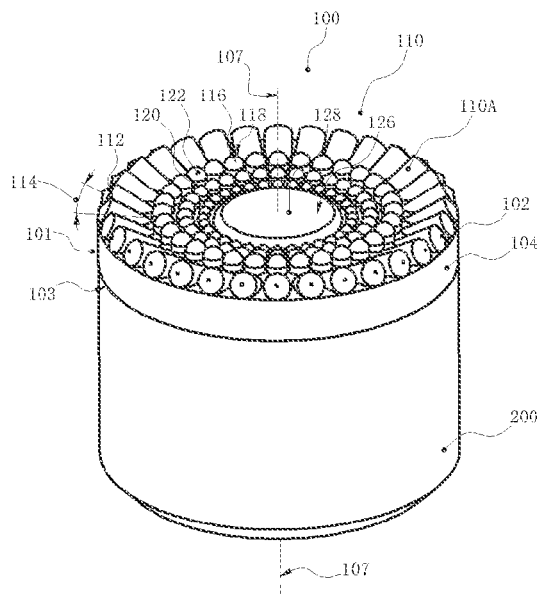
FIG. 34 discloses another example of a polycrystalline element as described in the summary.
Figure 35:
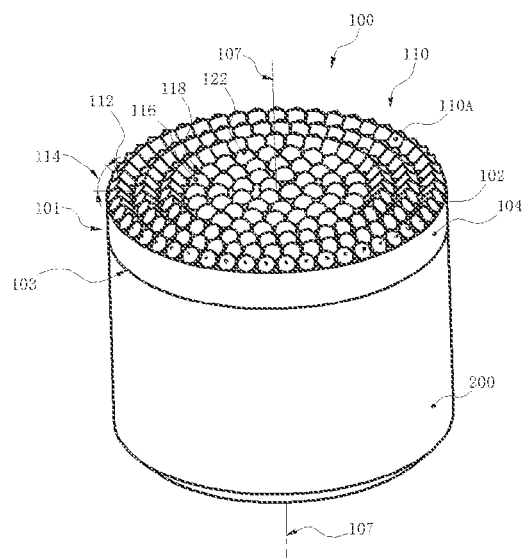
FIG. 35 discloses another example of a polycrystalline element as described in the summary.
Figure 36:
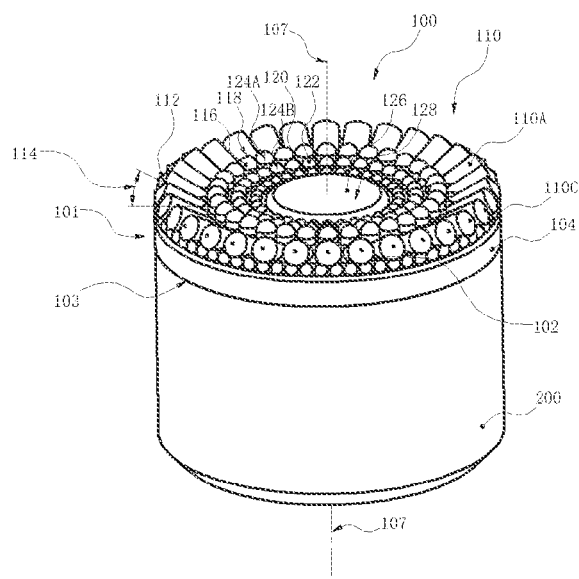
FIG. 36 discloses another example of a polycrystalline element as described in the summary.

The first surface 102 may optionally include at least one chamfered surface 105, as illustrated in at least FIGS. 4, 8, 13, 18, 31, 32. Stated differently, the chamfered surface 105 is a part of or a portion of the first surface 102. The chamfered surface 105 may define a plane that intersects a horizontal plane, as one of skill in the art will understand from this description and the figures even without labeling the various planes as such. Optionally, the first surface 102 may include a plurality of chamfered surfaces, as illustrated in at least FIGS. 18, 32, and 33. At least one extension 110A of the plurality of extensions 100 may extend away from the at least one chamfered surface 105, as illustrated in at least FIGS. 4, 8, 31, and 32.

Figure 3:
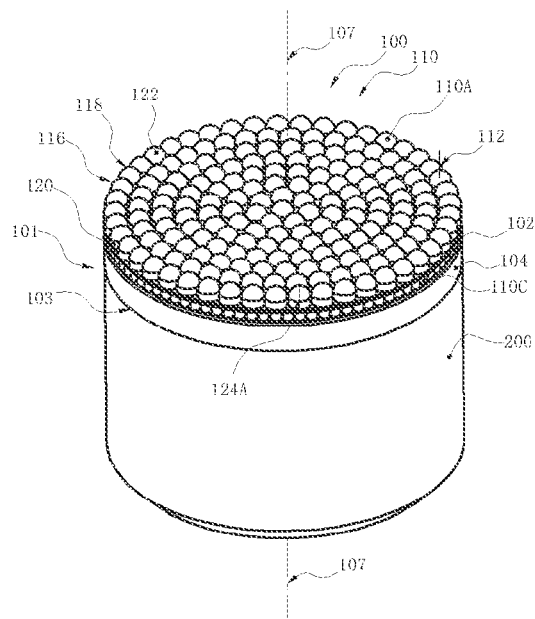
FIG. 3 discloses another example of a polycrystalline element as described in the summary.

Optionally, at least one extension 110A of the plurality of extensions 100 may extend away from the at least one side 103, as illustrated in at least FIG. 3. The at least one extension 110 extending away from the at least one side 103 may include a long axis (not labeled, although one of skill of the art will understand the meaning in view of the discussion above related to long axis 112) intersecting the at least one side 103 at any angle between 0 degrees to 90 degrees or any sub-range or specific angle between degrees to 90 degrees as discussed above relative to the extensions extending away from at least the first surface 102.

Figure 39:
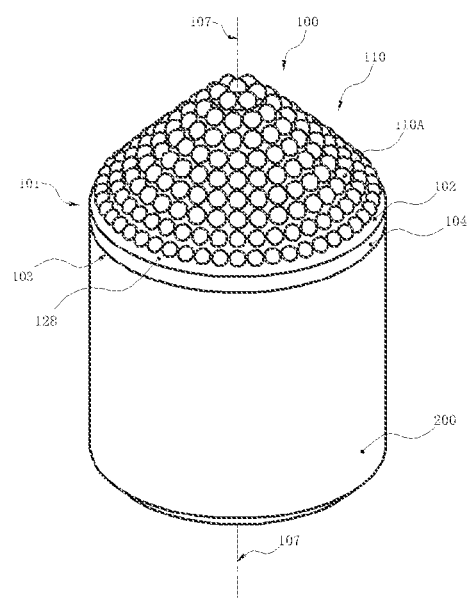
FIG. 39 discloses another example of a polycrystalline element as described in the summary.
Figure 40:
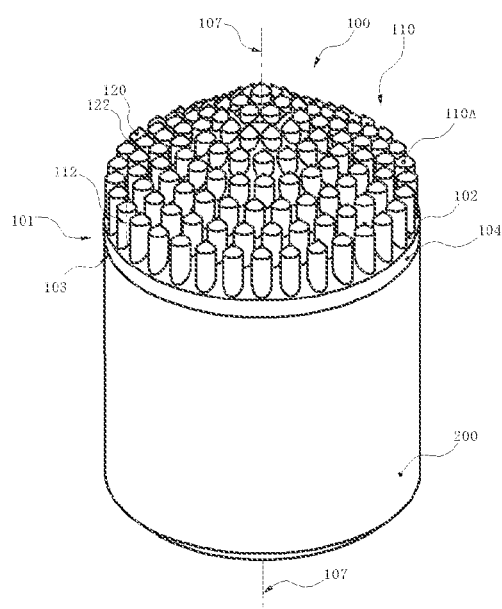
FIG. 40 discloses another example of a polycrystalline element as described in the summary.

The polycrystalline element 100 may include a raised portion 126 comprising polycrystalline diamond that extends adjacent to at least a first set of the plurality of extensions 111A and a second set of the plurality of extensions 111B, as illustrated in at least FIGS. 9-12, 18, 47, and 49. Optionally, the polycrystalline diamond of the raised portion 126 may contiguous and optionally integrally formed with the polycrystalline diamond of the first surface 102. The raised portion or at least a portion 126 may include raised portion surface 128 that is at least one of planar (e.g., at least FIG. 9), spherical, hemi-spherical (e.g., at least FIG. 37), cylindrical, conical (e.g., at least FIG. 39), frusto-conical, polyhedral, tear-dropped, and irregular shaped. Stated differently, at least a portion 128 of the first surface 102 is one of spherical, hemi-spherical (e.g., at least FIG. 37), cylindrical, planar, conical (e.g., at least FIG. 39), frusto-conical, and polyhedral.

Figure 4:
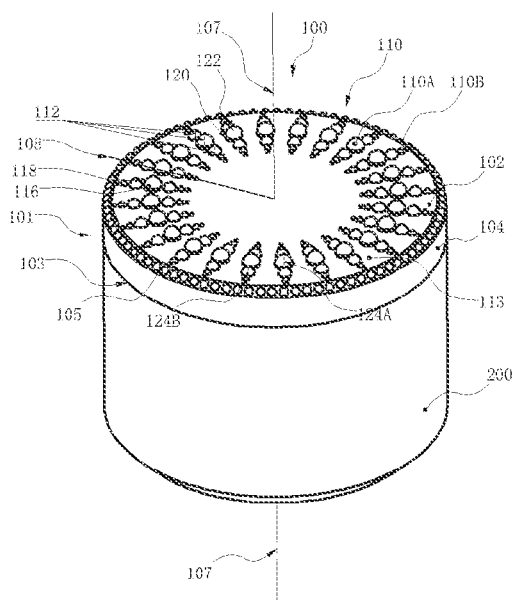
FIG. 4 discloses another example of a polycrystalline element as described in the summary.

As discussed above, for purposes of defining a geometric position of a subset of the plurality of extensions 110, a radial line 108 extends radially outward from a center axis 107 of the first surface 102 and intersects each of the long axis 112 of a subset 113 of the plurality of extensions 110, as illustrated in at least FIG. 4.

Optionally, the plurality of extensions 110 may form a spiral pattern on the first surface 102 that begins with at least one extension positioned closest to a center or the center axis 107 of the first surface 102 and/or a concentric pattern around a center or the center axis 107 of the first surface 102.

Optionally, at least a first subset 115A of the plurality of extensions 110 is spaced apart from and parallel to at least a second subset 115B of the plurality of extensions 110, as illustrated in at least FIG. 17.

Optionally, the polycrystalline element 100 includes a carbide substrate 200 coupled to the second surface 103 of the table 100. The carbide substrate may be of any type of carbide or other substitute for carbide to which polycrystalline diamond tables or compacts may be coupled to. The second surface 103 and the carbide substrate 200 may include various three-dimensional features that are complementary and/or interlock. The second surface 103 may be adhered or pressed/sintered together to the carbide substrate 200 in any manner typically used to do so as known in the art.

Figure 50:
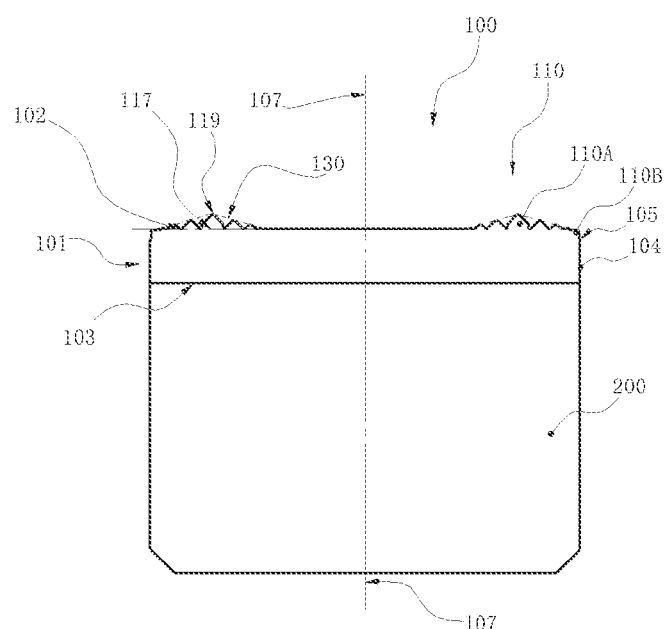
FIG. 50 discloses another example of a polycrystalline element as described in the summary.
Figure 51:
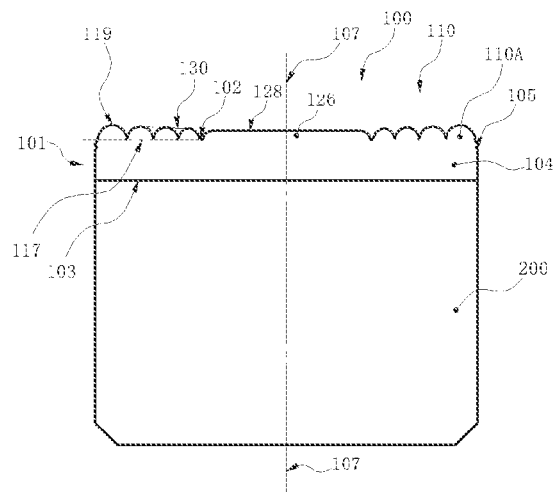
FIG. 51 discloses another example of a polycrystalline element as described in the summary.
Figure 52:
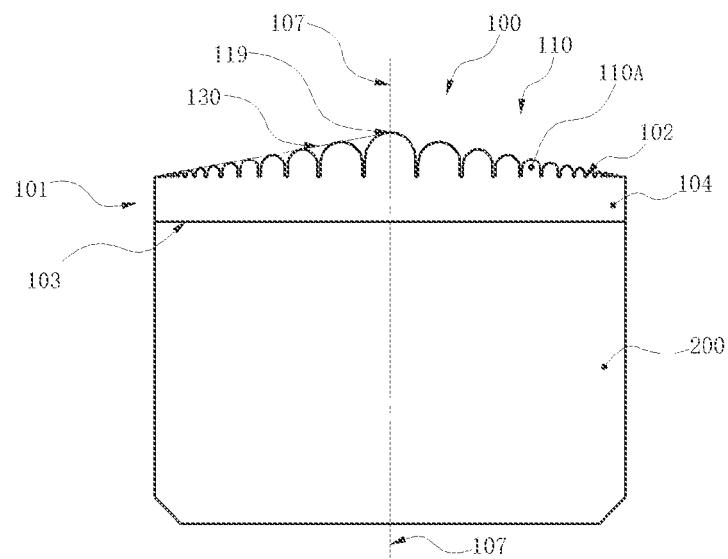
FIG. 52 discloses another example of a polycrystalline element as described in the summary.

Referring to FIGS. 50-52, the polycrystalline element 100 may include at least a subset 117 of the plurality of extensions 110, wherein each extension in the subset includes a furthest most point 119 from the first surface 102, and wherein when the subset 117 of the plurality of extensions is viewed in profile, a profile line 130 intersects each furthest most point of each extension within the subset 117 of the plurality of extensions 110, and wherein the profile line intersects a horizontal line 132 coincident with the first surface 102, as illustrated in at least FIG. 51.

The polycrystalline element 100 may optionally include at least one groove 109 extending at least partially into at least one of the first surface 102 and the at least one side 103, as illustrated in at least FIGS. 46-49. Within the at least one groove 109, at least another polycrystalline extension 134 may be positioned and extend away from the at least one groove 103. The at least another polycrystalline extension 134 may have any of the features described above with respect to the various polycrystalline extensions 110 and its various subsets in any combination, as one of skill in the art would understand.

The polycrystalline element 100 in any of the various examples disclosed above may be formed by a process that includes at least one of laser machining, electro-discharge machining, electro-discharge grinding, and by pressing (e.g., any hydraulic press, including poly-axial presses).

Figure 54:
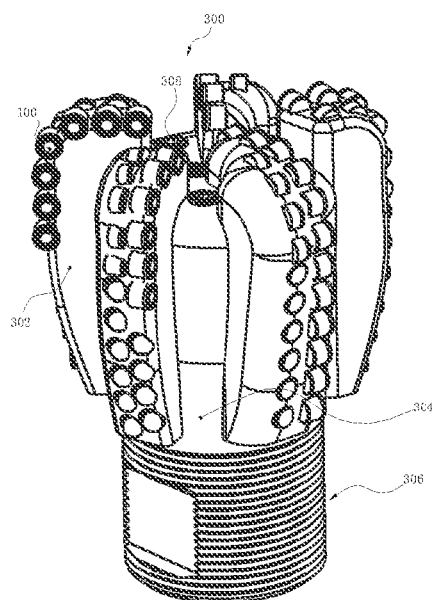
FIG. 54 discloses a perspective view of a fixed blade drill bit that can be used with any of the disclosed embodiments and examples of the polycrystalline element.

Optionally, a downhole tool 300 may include at least one polycrystalline element 100 in any variation as described above, as illustrated in FIG. 54. The downhole tool 300 may be one of a roller cone bit, a fixed blade bit (as illustrated in FIG. 54), a bi-center drill bit, a hole opener, a reamer, and a mill. As disclosed in FIG. 54, the fixed blade bit 300 includes at least one blade 302, a junk slot or fluid flow path 304, a connection 306 for coupling the bit 300 to a drill string or a bottom hole assembly (not illustrated), and at least one jet to allow drilling fluid to pass therethrough. The polycrystalline element 100 may be brazed, press-fit, or otherwise coupled to the downhole tool, whether directly to the surface or in a pocket configured to receive the polycrystalline element 100.

Figure 55A:
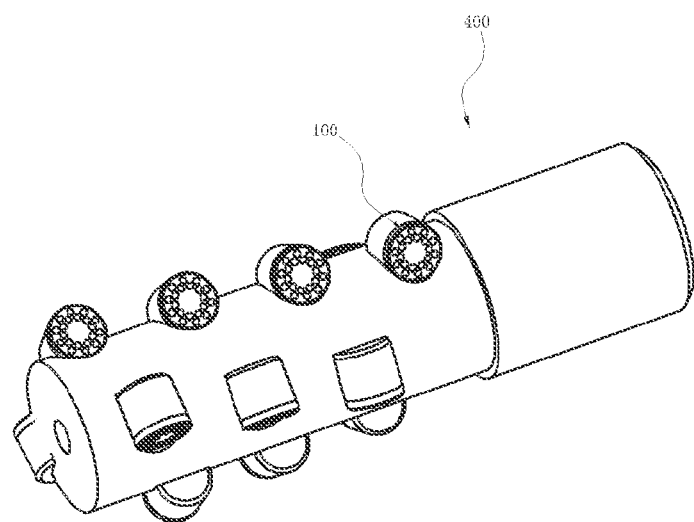
FIG. 55A discloses a perspective view of a machine tool that can be used with any of the disclosed embodiments and examples of the polycrystalline element.
Figure 55B:
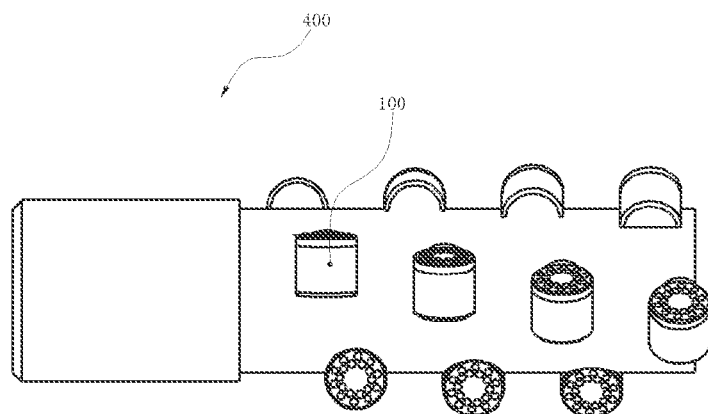
FIG. 55B discloses a plan view of the machine tool in FIG. 55A.

Optionally, a machine tool 400 for use in at least one of a plane, a mill, a drill, and a lathe, may use at least one polycrystalline element 100 in any variation as described above, as illustrated in FIGS. 55A and 55B. FIGS. 55A and 55B disclose a mill bit for use in a mill. The polycrystalline element 100 may be brazed, press-fit, or otherwise coupled to the machine tool 400, whether directly to the surface or in a pocket configured to receive the polycrystalline element 100.

Figure 56:
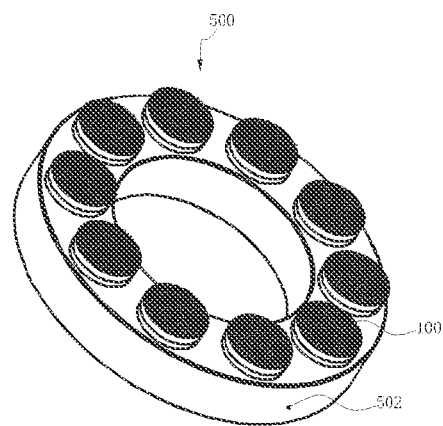
FIG. 56 discloses a perspective view of an example of a bearing that can be used with any of the disclosed embodiments and examples of the polycrystalline element.

Optionally, a bearing 500 may use at least one polycrystalline element 100 in any variation as described above, as illustrated in FIG. 56. The bearing 500 as illustrated is a thrust bearing that includes a ring 502 to which the polycrystalline element 100 is coupled. Of course, any other type of bearing in any application may use at least polycrystalline element 100 in any variation as described above.

The one or more present inventions, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure.

The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

LIST OF NUMBERED EMBODIMENTS

1. A polycrystalline element comprising:
   a table comprising polycrystalline diamond, the table including:
      a first surface;
      a second surface spaced apart from the first surface;
      at least one side extending between the first surface and the second surface;
   a plurality of extensions comprising polycrystalline diamond, wherein at least one extension of the plurality of extensions extends away from at least one of the first surface and the at least one side.

2. The polycrystalline element of claim 1, wherein at least one extension of the plurality of extensions is spaced apart from at least one adjacent extension.

3. The polycrystalline element of claim 1 or claim 2, wherein at least one extension of the plurality of extensions includes a long axis that intersects at least one of the first surface and the side at an angle between 0 degrees to 90 degrees relative to the first surface and the side, respectively.

4. The polycrystalline element of any of claims 1 through 3, wherein at least one extension of the plurality of extensions includes an end spaced apart from the first surface, wherein the end includes a curved surface.

5. The polycrystalline element of any of claims 1 through 4, wherein at least one extension of the plurality of extensions includes a first portion that is at least one of spherical, hemi-spherical, cylindrical, conical, frusto-conical, polyhedral, tear-dropped, and irregular shaped.

6. The polycrystalline element of any of claims 1 through 5, wherein the at least one extension of the plurality of extensions includes a second portion positioned between the first portion and the first surface, wherein the second portion extends a distance away from the first surface.

7. The polycrystalline element of claim 6, wherein the second portion is at least one of spherical, hemi-spherical, cylindrical, conical, frusto-conical, polyhedral, tear-dropped, and irregular shaped.

8. The polycrystalline element of any of claims 1 through 7, wherein at least one extension of the plurality of extensions includes a height that is different from another height of at least another extension of the plurality of extensions.

9. The polycrystalline element of any of claims 1 through 8, wherein the first surface includes at least one chamfered surface.

The polycrystalline element of claim 9, wherein at least one extension of the plurality of extensions extends away from the at least one chamfered surface.

11. The polycrystalline element of claim 9, wherein the first surface comprises a plurality of chamfered surfaces.

12. The polycrystalline element of any of claims 1 through 11, wherein at least one extension of the plurality of extensions extends away from the at least one side.

13. The polycrystalline element of any of claims 1 through 12, further includes a raised portion comprising polycrystalline diamond that extends adjacent to at least a first set of the plurality of extensions and a second set of the plurality of extensions.

14. The polycrystalline element of claim 13, wherein the polycrystalline diamond of the raised portion is contiguous with the polycrystalline diamond of the first surface.

15. The polycrystalline element of claim 13, wherein the raised portion includes a raised portion surface that is at least one of planar, spherical, hemi-spherical, cylindrical, conical, frusto-conical, polyhedral, tear-dropped, and irregular shaped.

16. The polycrystalline element of claim 3, wherein a radial line extends radially outward from a center axis of the first surface intersects each of the long axis of a subset of the plurality of extensions.

17. The polycrystalline element of any of claims 1 through 16, wherein the plurality of extensions form a spiral pattern that begins with at least one extension positioned closest to a center of the first surface.

18. The polycrystalline element of any of claims 1 through 17, wherein the plurality of extensions form a concentric pattern around a center of the first surface.
19. The polycrystalline elements of any of claims 1 through 18, wherein at least a first subset of the plurality of extensions is spaced apart from and parallel to at least a second subset of the plurality of extensions.
20. The polycrystalline element of any of claims 1 through 19, further comprising a carbide substrate coupled to the second surface of the table.
21. The polycrystalline element of any of claims 1 through 20, wherein the polycrystalline diamond of at least one extension of the plurality of extensions is contiguous with the polycrystalline diamond of the table.
22. The polycrystalline element of any of claims 1 through 21, wherein at least one extension of the plurality of extensions is spaced apart from at least another extension of the plurality of extensions so as to define a fluid flow path therebetween.
23. The polycrystalline element of any of claims 1 through 22, wherein at least a portion of the first surface is one of spherical, hemi-spherical, cylindrical, planar, conical, frusto-conical, and polyhedral.
24. The polycrystalline element of any of claims 1 through 23, wherein each extension in at least a subset of the plurality of extensions includes a furthest most point from the first surface, and wherein when the subset of the plurality of extensions is viewed in profile, a profile line intersects each furthest most point of each extension within the subset of the plurality of extensions, and wherein the profile line intersects a horizontal line coincident with the first surface.

The polycrystalline element of any of claims 1 through 24, further comprising at least one groove extending at least partially into at least one of the first surface and the at least one side.

26. The polycrystalline element of claim 25, wherein the at least one groove includes at least another polycrystalline extension extending away from the at least one groove.
27. The polycrystalline element of any of claims 1 through 26, wherein the polycrystalline element is formed by a process that includes at least one of laser machining, electro-discharge machining, electro-discharge grinding, and by pressing.
28. A downhole tool that includes at least one polycrystalline element of any of claims 1 through 27.
29. The downhole tool of claim 28, wherein the downhole tool is one of a roller cone bit, a fixed blade bit, a bi-center drill bit, a hole opener, a reamer, and a mill.
30. A machine tool for use in at least one of a plane, a mill, a drill, and a lathe, wherein the machine tool includes at least one polycrystalline element of any of claims 1 through 27.
31. A bearing that includes at least one polycrystalline element of any of claims 1 through 27.

The invention claimed is:
1. A polycrystalline element comprising:
a table comprising polycrystalline diamond, the table including:
a first surface;
a second surface spaced apart from the first surface;
at least one side extending between the first surface and the second surface; and,
a plurality of extensions comprising polycrystalline diamond, wherein at least one extension of the plurality of extensions extends away from at least one of the first surface and the at least one side, wherein at least one extension of the plurality of extensions includes a long axis that intersects at least one of the first surface and the side at an angle between 0 degrees to 90 degrees relative to the first surface and the side, respectively, and a radial line extends radially outward from a center axis of the first surface intersects each of the long axis of a subset of the plurality of extensions.

2. The polycrystalline element of claim 1, wherein at least one extension of the plurality of extensions is spaced apart from at least one adjacent extension.
3. The polycrystalline element of claim 1, wherein at least one extension of the plurality of extensions includes an end spaced apart from the first surface, wherein the end includes a curved surface.
4. The polycrystalline element of claim 1, wherein at least one extension of the plurality of extensions includes a first portion that is at least one of spherical, hemi-spherical, cylindrical, conical, frusto-conical, polyhedral, tear-dropped, and irregular shaped.
5. The polycrystalline element of claim 4, wherein the at least one extension of the plurality of extensions includes a second portion positioned between the first portion and the first surface, wherein the second portion extends a distance away from the first surface.
6. The polycrystalline element of claim 5, wherein the second portion is at least one of spherical, hemi-spherical, cylindrical, conical, frusto-conical, polyhedral, tear-dropped, and irregular shaped.
7. The polycrystalline element of claim 1, wherein at least one extension of the plurality of extensions includes a height that is different from another height of at least another extension of the plurality of extensions.
8. The polycrystalline element of claim 1, wherein the first surface includes at least one chamfered surface.
9. The polycrystalline element of claim 8, wherein at least one extension of the plurality of extensions extends away from the at least one chamfered surface.
10. The polycrystalline element of claim 8, wherein the first surface comprises a plurality of chamfered surfaces.
11. The polycrystalline element of claim 1, wherein at least one extension of the plurality of extensions extends away from the at least one side.
12. The polycrystalline element of claim 1, further includes a raised portion comprising polycrystalline diamond that extends adjacent to at least a first set of the plurality of extensions and a second set of the plurality of extensions.
13. The polycrystalline element of claim 12, wherein the polycrystalline diamond of the raised portion is contiguous with the polycrystalline diamond of the first surface.
14. The polycrystalline element of claim 12, wherein the raised portion includes a raised portion surface that is at least one of planar, spherical, hemi-spherical, cylindrical, conical, frusto-conical, polyhedral, tear-dropped, and irregular shaped.
15. The polycrystalline element of claim 1, wherein the plurality of extensions form a concentric pattern around a center of the first surface.
16. The polycrystalline element of claim 1, wherein at least a first subset of the plurality of extensions is spaced apart from and parallel to at least a second subset of the plurality of extensions.

17. The polycrystalline element of claim 1, further comprising a carbide substrate coupled to the second surface of the table.

18. The polycrystalline element of claim 1, wherein the polycrystalline diamond of at least one extension of the plurality of extensions is contiguous with the polycrystalline diamond of the table.

19. The polycrystalline element of claim 1, wherein at least one extension of the plurality of extensions is spaced apart from at least another extension of the plurality of extensions so as to define a fluid flow path therebetween.

20. The polycrystalline element of claim 1, wherein at least a portion of the first surface is one of spherical, hemi-spherical, cylindrical, planar, conical, frusto-conical, and polyhedral.

21. The polycrystalline element of claim 1, wherein each extension in at least a subset of the plurality of extensions includes a furthest most point from the first surface, and wherein when the subset of the plurality of extensions is viewed in profile, a profile line intersects each furthest most point of each extension within the subset of the plurality of extensions, and wherein the profile line intersects a horizontal line coincident with the first surface.

22. The polycrystalline element of claim 1, wherein the polycrystalline element is formed by a process that includes at least one of laser machining, electro-discharge machining, electro-discharge grinding, and by pressing.

23. A downhole tool that includes at least one polycrystalline element in accordance with claim 1.

24. The downhole tool of claim 23, wherein the downhole tool is one of a roller cone bit, a fixed blade bit, a bi-center drill bit, a hole opener, a reamer, and a mill.

25. A machine tool for use in at least one of a plane, a mill, a drill, and a lathe, wherein the machine tool includes at least one polycrystalline element in accordance with claim 1.

26. A bearing that includes at least one polycrystalline element in accordance with claim 1.

* * * * *